United States Patent Office 2,830,887
Patented Apr. 15, 1958

2,830,887
METHOD AND COMPOSITION FOR AMMONIA FUMIGATION OF SOILS

Frederick C. Bersworth, East Orange, N. J., assignor to The Dow Chemical Company, Midland, Mich., a corporation of Delaware No Drawing. Application June 18, 1953
Serial No. 362,687

7 Claims. (Cl. 71—3)

This invention relates to a method and composition for the ammoniation of soils, and in particular is concerned with the application of certain polynitriles to soils to bring about conditions wherein a controlled liberation of ammonia occurs for fumigation of those soils.

In many agricultural establishments it has been found that the repeated use of copper insecticides had brought about a condition wherein an excess amount of copper is present in the soil as the inorganic compound used as the insecticide. Generally no serious deleterious effects result therefrom. However, when the soil is treated with certain ingredients, for example, ammonia, to kill off insect life harmful to the roots of the plants, or to supply needed ammonia to the soil, reaction between the ammonia and copper occurs to form complex copper-ammonia compounds, which thereby render copper available to the plant and available in such concentration as to produce toxic effects. Also, where copper has been liberally used as an insecticide in certain areas, the toxicity shows in the plants when fertilizers having high nitrogen or ammonia content are used. It is accordingly a fundamental object of the instant invention to provide agents, which, when applied to the soil, will permit a slow, controlled release of ammonia in the soil by which the ammonia requirements of the soil can be satisfied without at the same time inducing the effects of copper toxicity in the plant.

It is another object of the invention to provide a method and composition for bringing about controlled release of ammonia in the vicinity of roots of plants, and at the same time to avoid the increase in the formation of copper ammonia complexes.

Other objects and advantages of the invention will in part be obvious and in part appear hereinafter.

The invention accordingly is based upon the method of bringing about a controlled release of ammonia in soil, and a composition for so doing which is characterized by the application to the soil in which the plant is growing of a composition containing a compound corresponding to the following general formula:

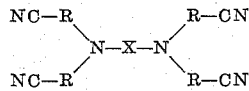

wherein X is an alkylene group which contributes two to three carbon atoms to the chain, such as ethylene, isopropylene, trimethylene, 2,3-butylene, cyclohexane, which low molecular-weight monovalent alkyl radicals may be substituted with one or more low molecular-weight radicals; R is chosen from the group consisting of methylene, ethylene, isopropylene, trimethylene, and is preferably methylene. The composition may be any organic or inorganic carrier, the organic carriers being fertilizer materials, humus, compost, peat moss, and the inorganic carriers being inorganic chemical fertilizers, inert materials, such as sand, vermiculite and similar mineral fillers. Various other nitriles having similar structural entities in the molecules may be used, but for purposes of this invention those nitriles are preferred which are characterized by containing a plurality of nitrile groups appropriately disposed with reference to one another so that upon hydrolysis they not only give ammonia, but they also generate compounds having a structure which is characteristic of a very effective class of chelating agents. For example, with an agent such as ethylenediamine tetramethylenenitrile, one or more of the nitrile groups can be present as the partial or completely hydrolyzed form so that all hydrolysis products up to and including the tetra acid or salts of the acid may be present. The presence of such acids or salts, which are chelating agents, gives in the presence of moisture and metal ions, the metal chelate of the metal which forms the most stable chelate. If, for example, copper, zinc and ferric iron are present, the ferric iron will be preferentially chelated. This new form of iron will then be available and valuable for maintaining and satisfying the nutritional requirements of the plant for iron. Experience indicates that the preferential chelation of the iron occurs most effectively in acid soils.

Accordingly, the organic compounds of the nitrile family of the type herein described function in a dual capacity in that they provide for controlled release of ammonia and elimination, under proper conditions, of trace metal deficiencies, for example, iron. The compounds in accordance with the invention may be applied directly by broadcasting on the soil followed by a disking of the soil to work them beneath the surface, or they can be applied to the soil in a carrier such as a fertilizer or an inert carrier such as sand, so that they are available for hydrolysis in the soil.

The mechanism by which these nitrile compounds function as they are applied to the soil and hydrolyzed by moisture in the soil may be represented substantially as follows:

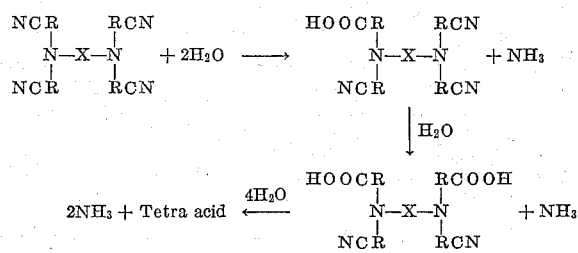

It will be seen that the nitrile groups on the compounds are hydrolyzed to form acid groups and ammonia. The ammonia is nascent and functions not only to fumigate the soil, but also to be available to the plant for satisfaction of nutritional requirements.

The residual compound left in the soil after hydrolysis of the nitrile group carries structural entities such that complex compounds with metal ions are formed thereby diminishing the possible toxic effect. At the same time, the metal is brought into a complex form and as such a minute trace of the metal is made available in the soil for assimilation by the plant.

Examples of specific compositions which can be made in accordance with this invention and applied to the soil to obtain the effects desired, are as follows:

Example 1

A composition consisting of a nitrogenous organic fertilizer, dried to remove moisture to a level below about 5 percent, has incorporated therein 5 percent of ethylenediamine tetraacetonitrile. It is then applied to the soil, in usual quantities as determined by the fertilizer requirements; on this basis the amount of fertilizer used is about 1 pound per 10 square feet, so that about 2/10 pound per 10 square feet of the nitrile is applied to the soil.

*Example 2*

A different mode of applying the compound to the soil is derived by incorporating it into a bulk soil conditioning agent such as the acrylonitrile soil conditioning materials. Here the ethylenediamine tetraacetonitrile is blended with the acrylonitrile conditioner in a proportion such that about 1/10 pound to about 5/10 pound per square foot of the soil is applied.

*Example 3*

Ordinary sand of about the grade used for forming mortar mixes is blended with ethylenediamine tetraacetonitrile and the sand then applied to the soil and worked in. The ratio in which the acetonitrile may be blended with the sand may be varied to suit the convenience of the commercial operation involved. Generally, however, a dilution of at least one part of sand to one part of the acetonitrile is desirable, because it then becomes easier to control the exact rate of application of the compound to the soil.

In each instance, the material applied to the soil was worked in by cultivating or disking in conventional style. Over the weeks immediately following the application, normal rainfall provided moisture for hydrolysis of the nitrile and a gradual fumigation of the soil was obtained. The effect lasts substantially through a three to four month growing season.

In one case several test areas of ¼ acre each were laid out in a field planted with celery which was showing serious copper toxicity. Application of the nitrile as set forth above produced within two weeks, a noticeable improvement in the condition of the plants. That is, ammonia released became available slowly to the plants; the chelating agents formed in the hydrolysis, reacted with copper in the soil to render it essentially unavailable to the plants. Where the plants show copper toxicity, the phenomenon is often called "copper induced" chlorosis, the application of the nitrile as described is particularly efficacious because copper catalyzes the hydrolysis of the nitrile. Hence, in the soil, the nitrile is hydrolyzed at a rate accelerated by the copper to yield ammonia and a chelating agent. As hydrolyzed the chelating agent reacts with copper in the soil and binds it in non-ionic form.

In general, it is found that the leaves from chlorotic trees and plants have a low iron content and are otherwise like chlorotic citrus leaves grown in calcareous soil. It is apparent that the disorder is due to a soil condition which reduces the iron uptake of the plant. High concentrations of such metals as zinc, manganese and in particular copper are known to produce iron chlorosis symptoms in plants.

It is not unusual in an established citrus grove to find a very high concentration in the top soil, that is, the top 6-inch layer, of 30 to 50 parts per million of copper. Substantially smaller amounts are found in young groves and very minute traces only in virgin soils; that is, they will contain less than one part per million.

In general, it may be said that in an acid soil, substantial chlorosis will occur when the total copper content of the soil approaches about 150 to 200 parts per million, which figure indicates about 300 pounds per acre per 6 inches. The copper chlorosis may be reduced and substantially eliminated by the treatment described herein.

When the nitriles are applied to the soil, several effects are detected. Even though the total quantity of nitrile applied may be extremely small, the quantity will be large enough to develop a certain degree of toxicity to bacteria or other micro-organisms. The organic nitriles generally are fairly effective fungicides and also organic nitriles are toxic to animal life in general. This toxicity is readily understandable since the nitriles are organic analogues of inorganic cyanides. Accordingly, when the ethylenediamine tetra nitrile is applied to soil, a very small amount will dissolve in moisture in the soil. Such nitrile, of course, develops physiological activity toward organisms which are present exerting their toxic effect toward living organisms in the medium.

The specific examples are given in terms of results obtained using the ethylene diamine tetraacetonitrile. Directly comparable results are obtained with the isopropylene diamine tetraacetonitrile and the corresponding propionic nitriles. This is because the structure of the compound formed upon hydrolysis of the nitrile is such that it can form five and six member rings with metals in the soil medium, as follows:

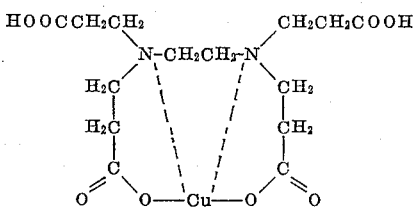

Though the invention has been described with reference to only a limited number of examples, it will be understood that variations thereof may be made without departing from the scope thereof.

What is claimed is:

1. A composition in which the carrier is sand characterized by its containing a compound corresponding to the following general formula

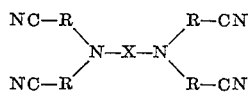

where X is an alkylene group which contributes 2–3 carbon atoms to the chain, and R is selected from the group consisting of methylene, ethylene, isopropylene and trimethylene.

2. A composition in which the carrier is a fertilizer having a moisture content not exceeding 5 percent, characterized by its containing a compound corresponding to the following general formula

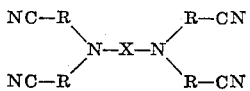

wherein X is an alkylene group which contributes 2–3 carbon atoms to the chain, and R is selected from the group consisting of methylene, ethylene, isopropylene and trimethylene.

3. The method of ammoniating soil, which comprises applying directly to the soil a composition suitable for use as a plant growing medium and characterized by its containing a compound corresponding to the following general formula

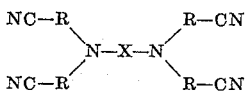

and working said composition into the soil, in said compound X being an alkylene group which contributes two to three carbon atoms to the chain, and R being chosen from the group consisting of methylene, ethylene, isopropylene, and trimethylene.

4. The method in accordance with claim 3 in which the compound is contained in a carrier.

5. The method in accordance with claim 4 in which the carrier is a fertilizer having a moisture content not exceeding 5 percent.

6. The method in accordance with claim 4 in which the carrier is vermiculite.

7. The method in accordance with claim 4 in which the carrier is sand.

References Cited in the file of this patent

UNITED STATES PATENTS

| | | |
|---|---|---|
| 2,205,995 | Ulrich et al. | June 25, 1940 |
| 2,230,931 | Bussert | Feb. 4, 1941 |
| 2,625,471 | Mowry et al. | Jan. 13, 1953 |

FOREIGN PATENTS

| | | |
|---|---|---|
| 512,691 | Great Britain | Sept. 21, 1939 |